US006169350B1

(12) United States Patent
Yang

(10) Patent No.: US 6,169,350 B1
(45) Date of Patent: *Jan. 2, 2001

(54) ELECTRICAL MACHINE MAGNETIC CIRCUIT STRUCTURE IN WHICH POLE-TO-ROTOR AIR CLEARANCES VARY ASYMMETRICALLY TO PROVIDE A MORE UNIFORM FLUX DISTRIBUTION

(76) Inventor: Tai-Her Yang, No. 32 Lane 29, Taipin St., Si-Hu Town, Dzan-Hwa (TW)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/033,595

(22) Filed: Mar. 3, 1998

(51) Int. Cl.[7] .............................. H02K 1/00; H02K 1/12; H02K 9/00; H02K 41/00; H02K 33/00
(52) U.S. Cl. .................... 310/216; 310/259; 310/60 A; 310/13; 310/27
(58) Field of Search .................................. 310/216, 217, 310/218, 254, 258, 259, 162, 166, 168, 171, 172, 207, 12, 13, 14, 60 A, 64, 65, 52, 27

(56) References Cited

U.S. PATENT DOCUMENTS

| 3,783,318 | * | 1/1974 | Widstrand | 310/216 |
|---|---|---|---|---|
| 3,866,071 | * | 2/1975 | Hallerback | 310/43 |
| 3,873,897 | * | 3/1975 | Muller | 318/138 |
| 4,012,653 | * | 3/1977 | Shigeta et al. | 310/217 |
| 4,209,720 | * | 6/1980 | Ducrot et al. | 310/45 |
| 4,241,274 | * | 12/1980 | Brammerlo | 310/259 |
| 4,249,099 | * | 2/1981 | Bhongbhibhat et al. | 310/261 |
| 4,254,350 | * | 3/1981 | Miroshnichenko et al. | 310/13 |
| 4,255,684 | * | 3/1981 | Mischler et al. | 310/216 |
| 4,365,180 | * | 12/1982 | Licata et al. | 310/216 |
| 5,041,749 | * | 8/1991 | Gaser et al. | 310/156 |
| 5,173,629 | * | 12/1992 | Peters | 310/216 |
| 5,191,257 | * | 3/1993 | Sugiyama | 310/198 |
| 5,742,110 | * | 4/1998 | Hefner | 310/154 |
| 5,763,976 | * | 6/1998 | Huard | 310/168 |
| 5,859,486 | * | 1/1999 | Nakahara et al. | 310/254 |

* cited by examiner

Primary Examiner—Nestor Ramirez
Assistant Examiner—Dang Dinh Le
(74) Attorney, Agent, or Firm—Bacon & Thomas, LLP

(57) ABSTRACT

An electrical machine structure includes a plurality of magnetic circuit units, each including at least two magnetic poles interconnected by a magnetic circuit structure. The magnetic circuit units are stacked or intercrossed in such a way that ventilation openings are formed between the magnetic circuit units. Clearances between the magnetic poles and an interactive electrical machine structure or rotor are arranged to vary asymmetrically across the lengths of the poles to provide a more uniform flux distribution. The use of relatively small magnetic circuit units arranged to form ventilation openings, and the manner in which the clearance between the magnetic poles is varied, enables the use of smaller pole structures than is possible with a conventional more integral magnetic circuit structure.

17 Claims, 7 Drawing Sheets

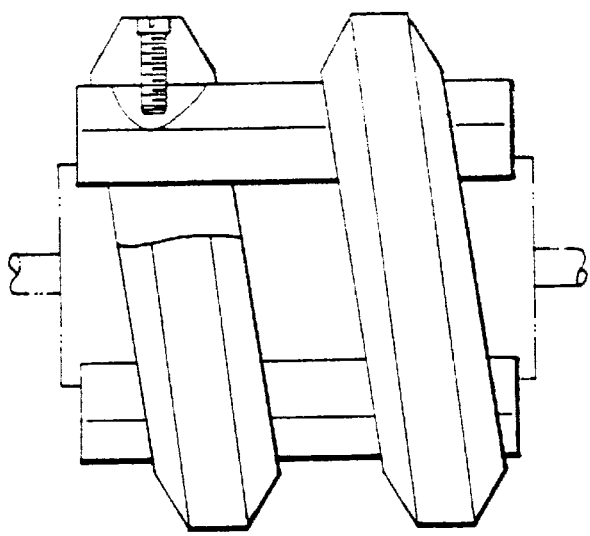
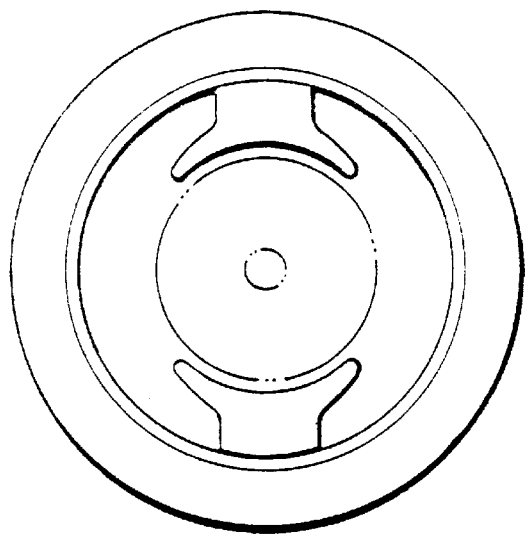
FIG. 13                     FIG. 14
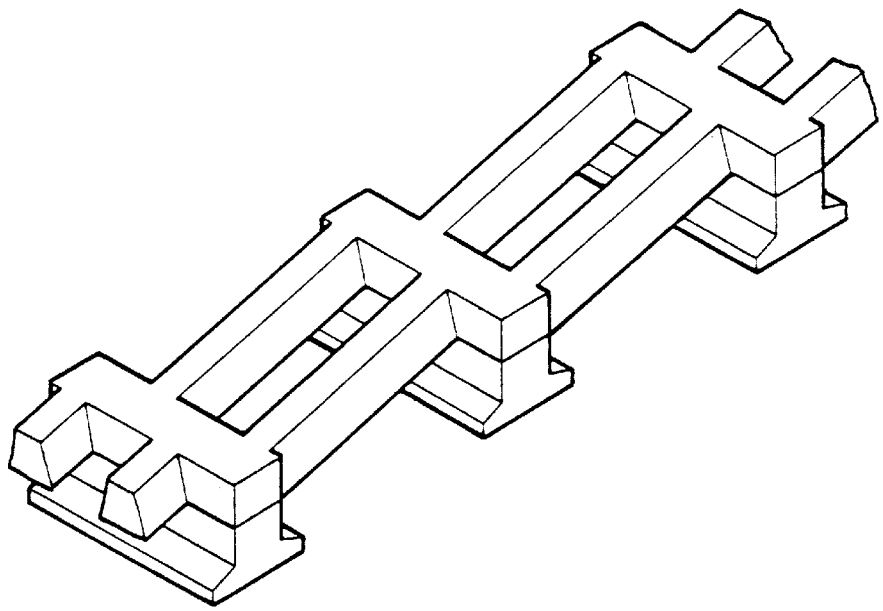
FIG. 15

ELECTRICAL MACHINE MAGNETIC CIRCUIT STRUCTURE IN WHICH POLE-TO-ROTOR AIR CLEARANCES VARY ASYMMETRICALLY TO PROVIDE A MORE UNIFORM FLUX DISTRIBUTION

BACKGROUND OF THE INVENTION

Conventional generators or motors are mostly constructed of the inter-pole ring-shaped magnetic circuits within single-sided or double-sided casings. The accumulated heat of the rotor and the magnetic field are usually cooled by an axial fan. As a result, when the electrical machine rotor is arranged to have a smaller diameter and a longer axial accumulated thickness, for example an air clearance between the rotor and the magnetic pole of around 0.2–1 mm (according to the parameter of power intensity, rotor diameter and rated rotating speed, etc.), the ventilation is poor.

SUMMARY OF THE INVENTION

The present invention provides an intercross-coupled magnetic circuit structure with uniform magnetic resistance obtained by adjusting the air clearance between magnetic poles and a corresponding driven rotor, and in particular by increasing the clearance between a particular magnetic pole and its corresponding driven rotor when the magnetic circuit connecting a pair of magnetic poles is shorter or the magnetic resistance of the magnetic circuit is smaller, and by decreasing the clearance when the magnetic circuit between the magnetic poles of the same pair is longer or the magnetic resistance is larger, so that the clearance at different symmetrical positions on the two sides of the magnetic axis of the particular magnetic pole varies, causing the magnetic force lines on the pole surface of the magnetic pole to be uniformly distributed, i.e., to appear symmetrical, in order to better meet electrical machine requirements by permitting a more narrow inter-pole magnetic circuit and providing a new method to effectively dissipate the accumulated heat inside the electrical machine. The magnetic circuit structure of the invention can use an intercrossed lamination construction, while maintaining the magnetic force line distribution status of the convention electrical machine magnetic circuit and the aforesaid more narrow inter-pole structure for more efficient heat dissipation. According to a further preferred embodiment of the invention, a field magnetic circuit structure with radial ventilation holes is provided, including a multiple section type iron core that has the advantage of reducing the size of the casting die and machining costs without hindering electrical machine characteristics.

BRIEF DESCRIPTION OF THE DRAWINGS

FIG. 13 is a side view of a fifth preferred embodiment of the invention.

FIG. 14 is a front view of the structure shown in FIG. 13.

FIG. 15 is a variation of the electrical machine structure, illustrating its application to linear driving structures.

DETAILED DESCRIPTION OF THE PREFERRED EMBODIMENTS

In the following preferred embodiments of the invention, an intercross-coupled magnetic circuit structure having a uniform magnetic resistance and varying air clearance is constructed to be more narrow than the accumulated axial thickness of a corresponding interactive electrical machine structure, such as a rotor, for easy direct heat dissipation. In the case of a rotor, the magnetic pole axial thickness is maintained the same as that of the rotor, while the total cross section area of the inter-pole magnetic circuit is increased/decreased according to the axial size, by increasing the clearance between a particular magnetic pole and its corresponding driven rotor when the magnetic circuit connecting the particular magnetic pole with another pole of the same pair is shorter or the magnetic resistance is smaller, and by decreasing the clearance when the magnetic circuit is longer or the magnetic resistance is larger between the two magnetic poles of the same pair, thereby causing the clearance between the magnetic pole and the correspondingly driven rotor, and the magnetic resistance of each corresponding position of the common structured magnetic circuit of the same pair, to appear in reverse proportion; i.e., the shorter the magnetic circuit of the corresponding magnetic pole surface and the position of the lower magnetic resistance, the larger the clearance to its correspondingly driven rotor, and vice versa. As a result, the clearance at symmetrical positions along the two sides of the pole axis varies asymmetrically in order to maintain the uniformed distribution of magnetic force lines on the magnetic pole surface and to let the magnetic force lines appear symmetrical at the two sides of the magnetic pole in order to meet electrical machine requirements. The inter-pole magnetic circuit of the invention is installed between the magnetic poles, with one or more than one intercrossed circuit structure extending at both sides to couple with the neighboring poles, or with one or more than one magnetic circuit structure arranged linearly or slanted on one side to couple with the neighboring magnetic poles, so that the spaces left between the inter-pole magnetic circuits form the intercrossed cooling holes, and the magnetic circuit structures connecting magnetic poles with different polarities, as well as the interactive electrical structure, periodically face the cooling holes during relative movement, wherein the inter-pole magnetic circuit structure is either constituted by an integral construction or by laminated blocks or sheets.

Figure 1:
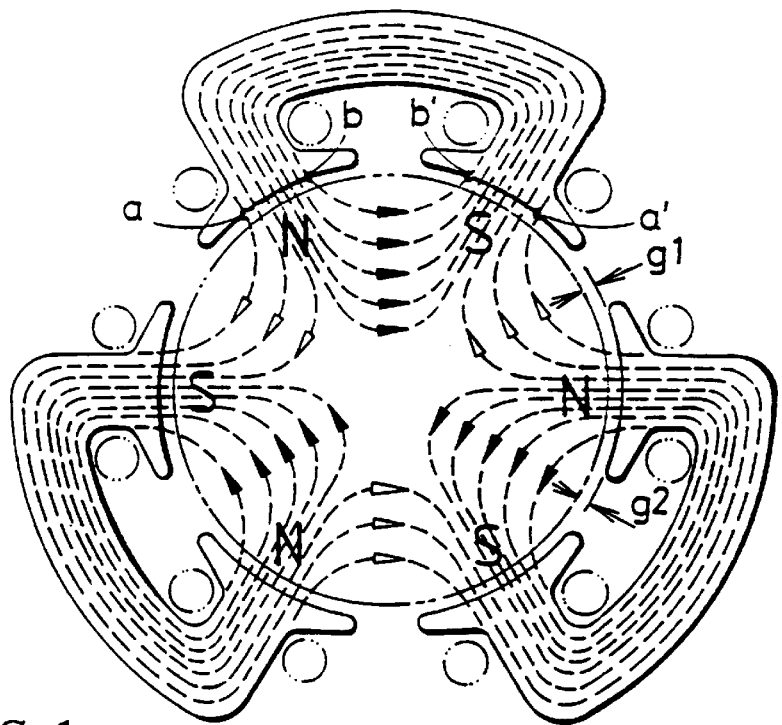
FIG. 1 is a diagram of the uniform magnetic flux distribution for a magnetic circuit constituted by magnetic pole pairs and symmetrical air clearances.
Figure 2:
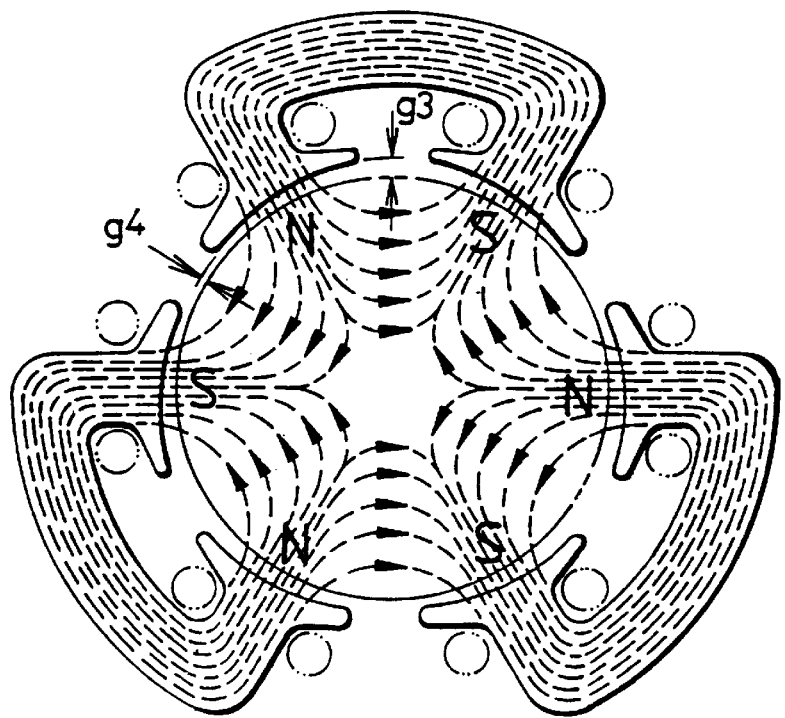
FIG. 2 is a diagram showing the more uniformly symmetrical magnetic flux distribution produced by the invention.

The aforesaid magnetic circuit structure with magnetic poles of different polarities at two ends forms the basic unit of the preferred construction. The problem solved by the present invention is that, because the magnetic circuit lengths of the exterior of the two magnetic poles a–a' and the interior of the two magnetic poles b–b' are different, the magnetic flux densities of the convention structure, i.e., a structure with symmetrical clearances along the two sides of the pole axis (g1=g2), have different values, so that the magnetic poles formed by the magnetic forces lines are unable to maintain a 180° angle, resulting increased loss and lowering efficiency. In contrast, in the present invention, the clearance between the exterior side and the interior side of the aforesaid magnetic poles, as well as their coupled interactive rotational electrical machine structure (which may be referred to as the rotor), are arranged to provide a larger clearance g3 between the interior side surface and its coupled interactive rotational electrical machine structure while providing a smaller clearance g4 between the exterior side surface and its coupled interactive rotational electrical machine structure, i.e., g3>g4, to thereby adjust the magnetic force lines distribution densities (as shown in FIG. 2) in order to maintain the two magnetic poles formed by the magnetic force lines at a 180° electromechanical angle.

Based on the above-described principles, the invention provides an intercross-coupled magnetic circuit structure having a uniform magnetic resistance achieved by adjusting the air clearance.

The circuit structure of the invention provides the following functions and economical effectiveness.

Firstly, the magnetic circuit structure is intercross constructed by independent iron core sheets having a relatively small area, instead of by the conventional method of stacking in such a way that the clearance between the magnetic pole surfaces and the rotor is increased to compensate for a shortened length or reduced magnetic resistance of the corresponding magnetic circuit between magnetic poles of the same pair, to thereby allow the electrical machine to have the advantage of maintaining the conventional magnetic circuit structure and providing uniform and symmetrical magnetic fluxes at the two sides while reducing the size of the molding die used to manufacture the magnetic circuit structure from the conventional integrated type, so that the cost of the molding die can be lowered without the need to use ultra-large punching equipment.

Secondly, the rotor which constituted the interactive electrical machine structure faces the radial ventilation holes directly, and is helpful in dissipating the heat from the electrical machine.

The innovative design of the present invention is for application in generators, motors, or other rotational or linear translation type electrical machine devices having magnetic poles that use either electric power excitation or permanent magnets to interact with a coupled interactive electrical machine structure. The invention provides a high heat dissipating electrical machine structure through inter-cross coupling with inter-pole magnetic circuits that couple with the magnetic force lines between the magnetic poles.

The magnetic poles are comprised of at least two or more than two poles which are constituted by permanent magnets or excitation winding core structures, wherein the front side of the magnetic poles are for coupling with the interactive electrical machine structure to generate rotation or linear driving forces.

The magnetic circuits coupled between the magnetic poles, made of a good magnetic conducting material, can extend on one side or both sides, are oriented in different directions, and each of the magnetic poles can by symmetrically or asymmetrically intercrossed so that the coupling position of the inter-pole magnetic circuits with the same orientation and each of the magnetic poles is perpendicularly extended in intercrossed symmetry, or obliquely extended at an asymmetrical position.

The interactive electrical machine structure corresponding to the magnetic pole may be comprised of an alternator type armature, or inductive type, winding type, permanent magnet type, good magnetic conductor type, or magnetic hysteresis type structural components, for providing interaction with the aforesaid field magnetic structure, either the field structure or the machine structure being a fixed body and the other a moving body, or both of them being moving bodies, arranged to provide rotational or linear driving motion.

The above elements are arranged such that the clearance between the magnetic pole and its correspondingly driven rotor is increased when the magnetic circuit is shorter or the magnetic resistance is smaller between the two magnetic poles of the same pair, or is decreased when the magnetic circuit is longer or the magnetic resistance is larger between the two magnetic poles of the same pair. The clearance varies asymmetrically for each particular pole, so that the magnetic forces lines on the pole surface of the magnetic pole can be maintained uniformly distributed, with the result that the magnetic force liens distribution at the two sides of the magnetic pole appears to be symmetrical in order to better meet the electrical machine requirements.

Figure 3:
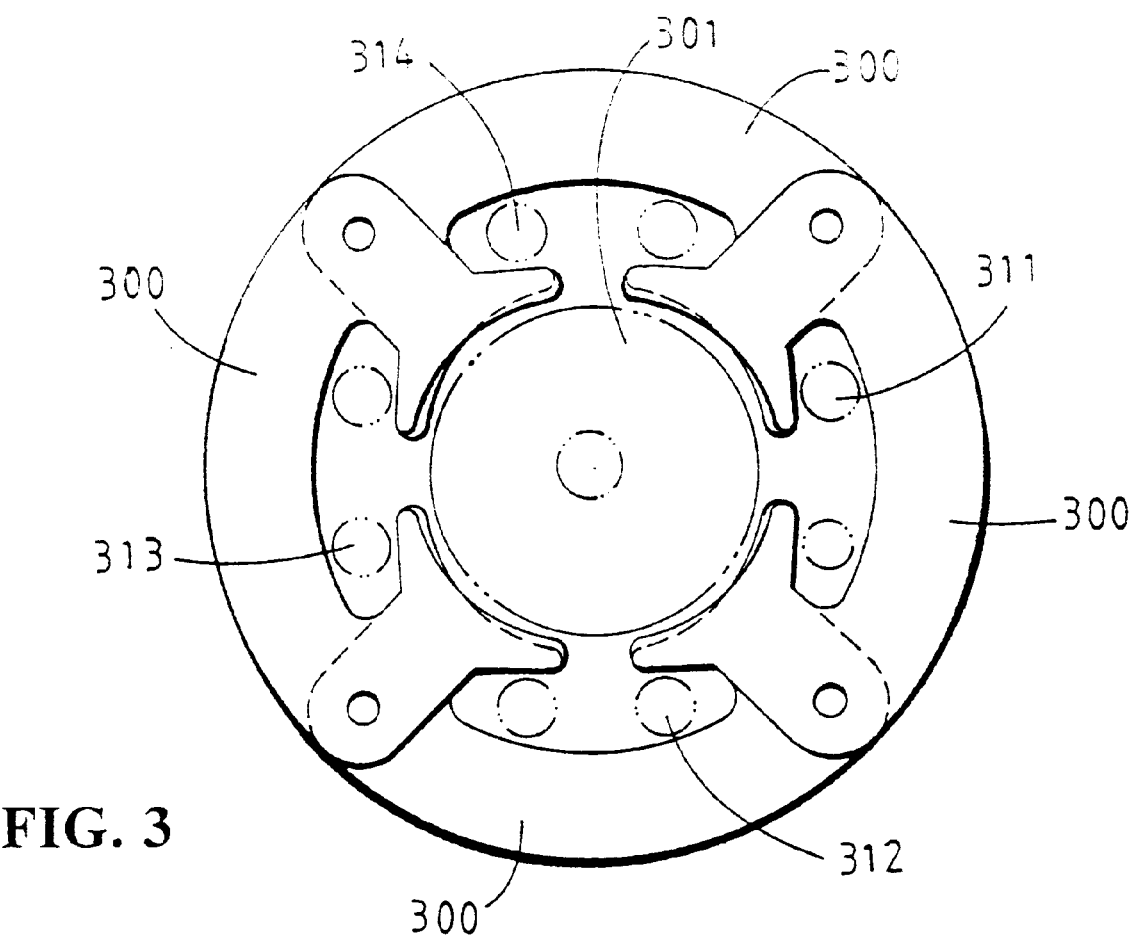
FIG. 3 is a plan view of a magnetic field circuit structure constructed according to the principles of a first preferred embodiment of the invention.
Figure 4:
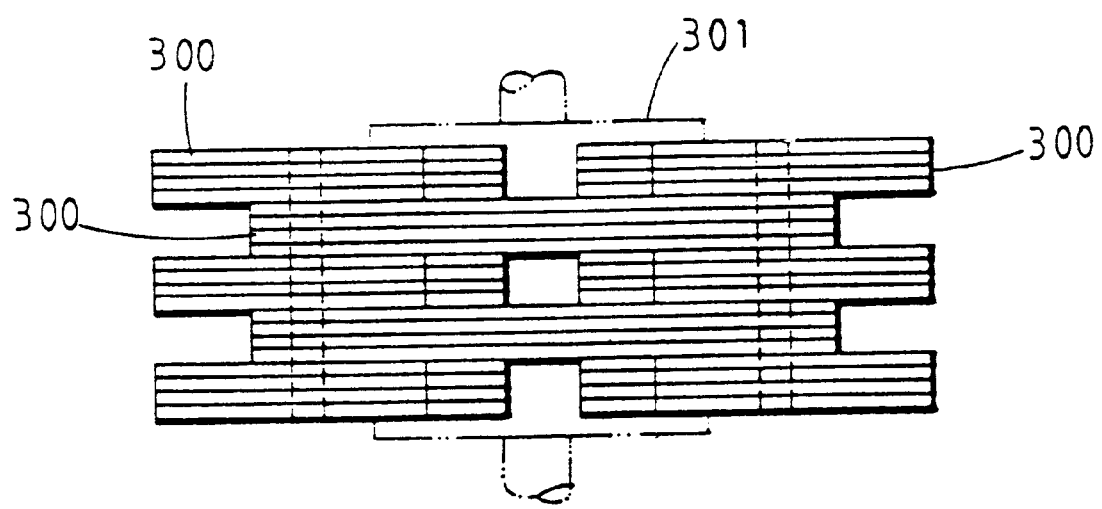
FIG. 4 is the side view of the structure shown in FIG. 3.
Figure 5:
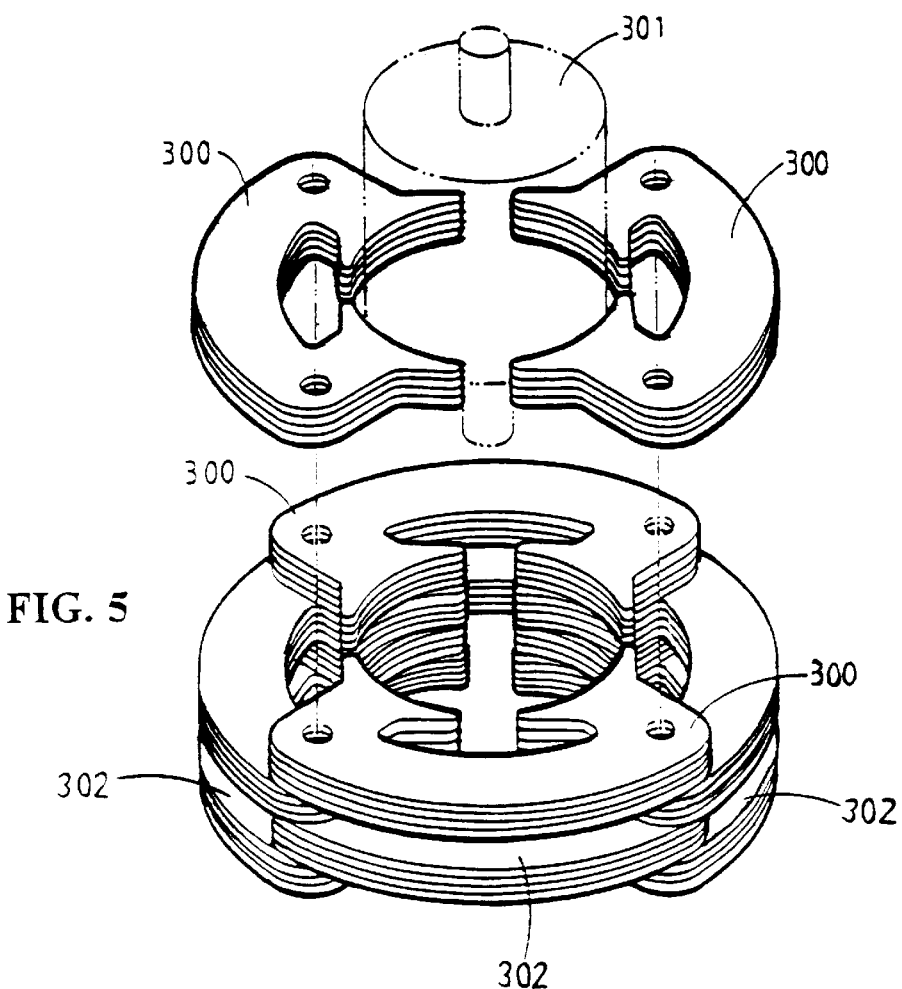
FIG. 5 is an isometric view of the structure shown in FIG. 3.

FIGS. 3–5 show a first preferred embodiment of an intercross-coupled magnetic circuit structure in which uniform magnetic resistance is obtained by adjusting air clearance and the field magnetic circuit structure is constituted by intercrossed magnetic conductor laminations. FIG. 3 is a front view of the preferred embodiment, FIG. 4 is a side view of the preferred embodiment, and FIG. 5 is a three-dimensional isometric view of the preferred embodiment.

The circuit structure is mainly comprised of the following elements:

A field magnetic circuit structure 300 made up of sheets of good magnetic conducting material such as silicon steel sheets, each having a non-closed configuration, the two ends of the sheets defining the positions of magnetic poles on which are series installed excited windings 311, 312, 313, 314, or which form combined permanent magnet type magnetic poles. The silicon steel sheets are intercross-laminated to constitute a ring-shaped field magnetic circuit structure with radial ventilating holes 302, or a linear electrical machine field magnetic circuit structure extended in chain-shaped intercrossed laminations; and An interactive electrical machine structure 301 corresponding to the magnetic pole constituted by an alternator type armature, or an induced type, winding type, permanent magnet type, good magnetic conductor type, or magnetic hysteresis type structural component which interacts with the aforesaid field magnetic structure. Either the field or interactive structure is a fixed body, and the other is a moving body, or both of them are moving bodies, whether in the rotational or linear driving variations.

The field magnetic circuit structure and interactive electrical machine structure of this embodiment are arranged such that the clearance between the magnetic pole and its corresponding driven rotor is increased when the magnetic shorter, or the magnetic circuit is resistance is smaller, between two magnetic poles of the same pair, or is decreased when the magnetic circuit is longer or the magnetic resistance is larger between the two magnetic poles of the same pair.

The clearance thus varies asymmetrically between symmetrical positions at the two sides of the magnetic axis, so that the magnetic force lines on the pole surface of the magnetic pole can be maintained uniformly distributed, and the magnetic force line distribution at the two sides of the magnetic pole appear symmetrical in order to better meet electrical machine requirements.

Figure 6:
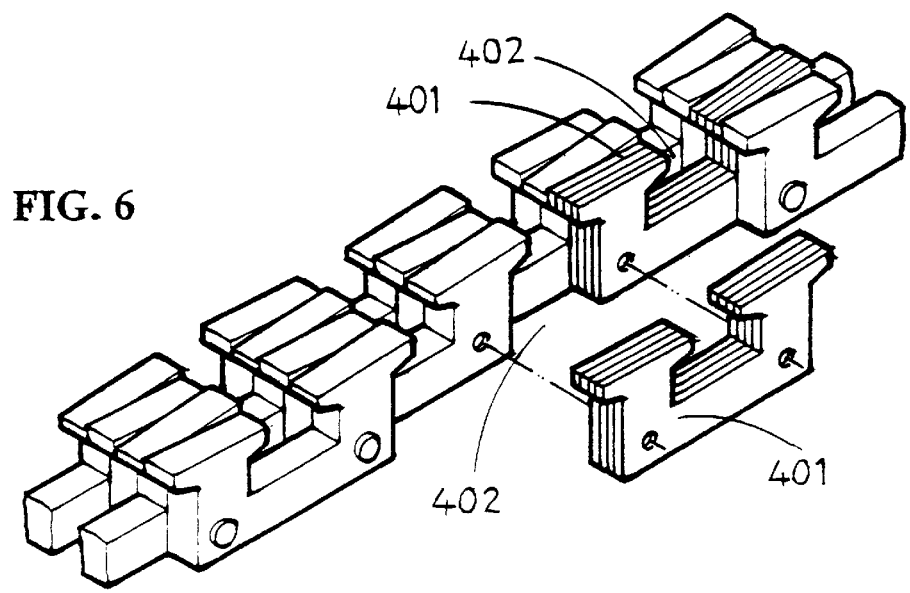
FIG. 6 is an isometric view of a variation of the electrical machine structure of FIGS. 3–5, applied to a linear driving machine.

FIG. 6 is a variation of the electrical machine structure of FIGS. 3–5, illustrating its application in a linear driving environment, which can be treated as similar to the extension of a large diameter and multiple pole rotational electrical machine structure using the elements of the embodiments of FIGS. 3–5 including magnetic circuit structures 400 and ventilation openings 401.

In practical applications, the following electrical machine embodiments can be selected.

Figure 7:
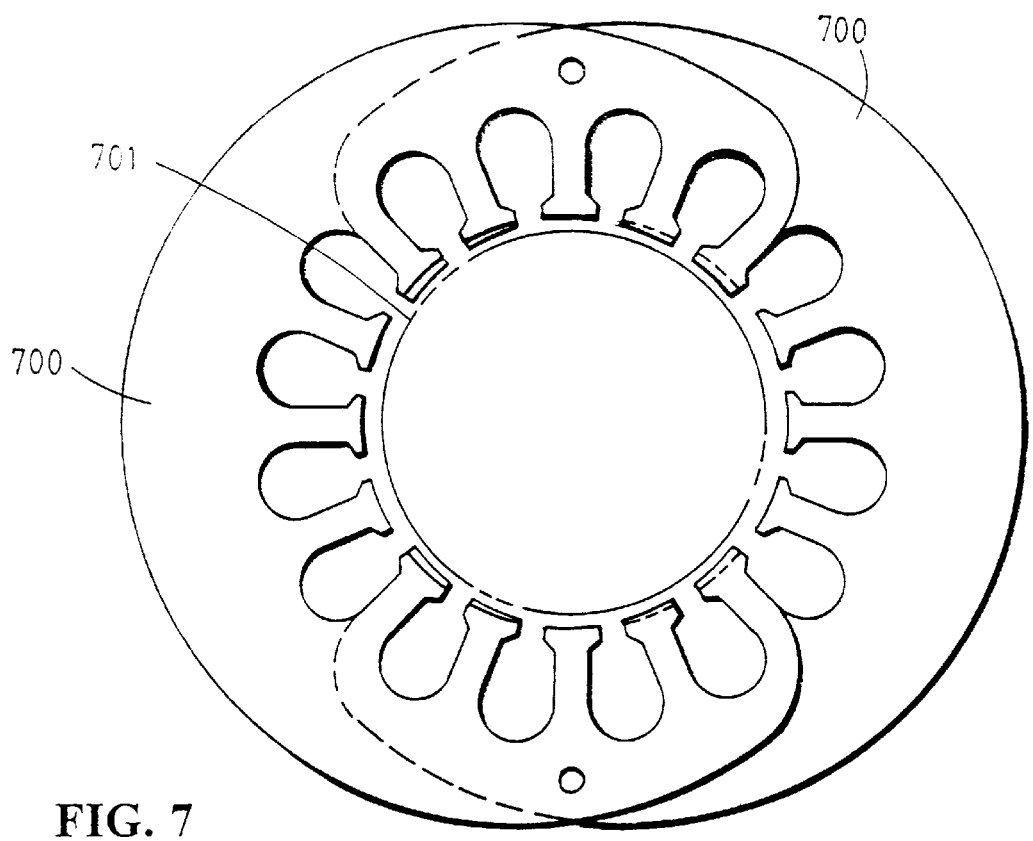
FIG. 7 is a plan view of a second preferred embodiment of the invention.

In the embodiments shown in FIG. 7, a wrapped excitation winding installed on a magnetic structure constituted by intercrossed laminated magnetic conductor sheets has the following elements:

A field magnetic circuit structure 700 made up of sheets of good magnetic conducting material such as silicon steel sheets, and formed in a non-closed configuration such that two ends of the sheets define the positions of magnetic poles, wherein each polar surface of the main magnetic circuit structure and an auxiliary magnetic circuit structure facing the interactive electrical machine structure has a at least one line slot for wrapping the excitation winding, and the silicon steel sheets are intercross-laminated to constitute a ring-shaped field magnetic circuit structure with radial ventilating holes, or a linear electrical machine field magnetic circuit structure extended in chain-shaped intercrossed laminations; and An interactive electrical machine structure 701 facing the magnetic poles and constituted by an alternator type armature, or an inducted type, winding type, permanent magnet type, good magnetic conductor type, or magnetic hysteresis type structural components which interacts with the aforesaid field magnetic structure, one of the field magnetic structure and electrical machine structure being a fixed body and the other a moving body, or both of the being moving bodies, the operating structure being arranged for rotational or linear driving and, as in the first preferred embodiment, has the following characteristics:

The clearance between the magnetic pole and its corresponding driven rotor is increased when the magnetic circuit is shorter, or the magnetic resistance is smaller, between the two magnetic poles of the same pair, so that the clearance varies asymmetrically at symmetrical positions at the two sides of the magnetic axis in order to cause the magnetic force lines on the pole surface of the magnetic pole to be uniformly distributed and the magnetic force line distribution at the two sides of the magnetic pole to appear symmetrical, thereby better meeting the electrical machine requirements.

Figure 8:
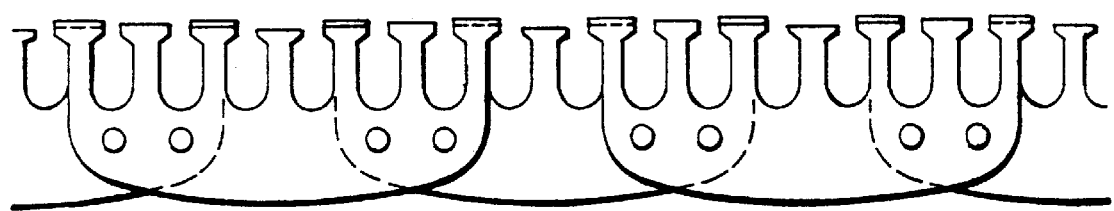
FIG. 8 is a plan view of a variation of the electrical machine structure of FIG. 7, illustrating its application to a linear driving machine.

In the variation shown in FIG. 8, the aforementioned structure is treated as similar to the extension of a large diameter and multiple pole rotational electrical machine structure, thereby providing a linearly driving arrangement structure.

Figure 9:
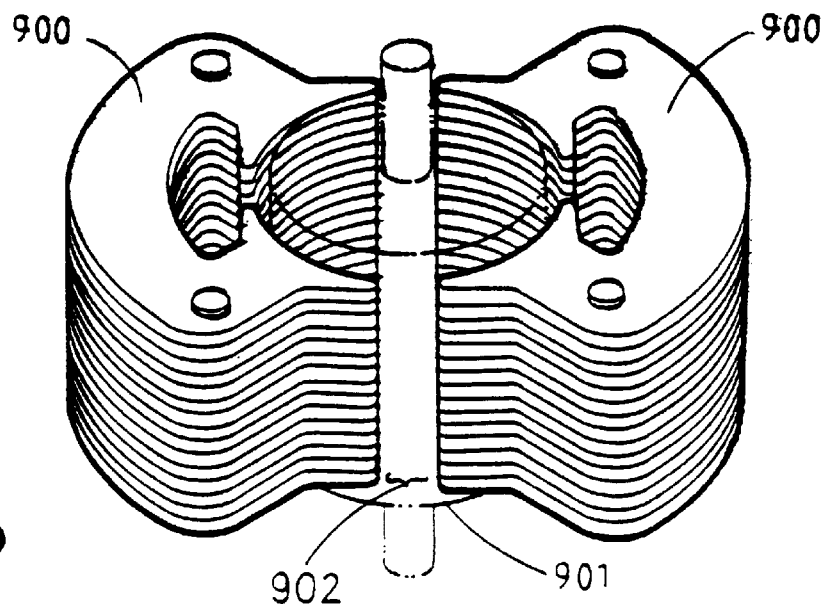
FIG. 9 is an isometric view of a four pole electrical machine structure constituted by two pairs of field magnetic circuit structures according to a third preferred embodiment of the invention.

The aforesaid intercross-coupled magnetic circuit structure with uniform magnetic resistance obtained by adjusting clearance can be varied by increasing the number of magnetic poles to more than two pairs having magnetic circuits constituted by independently installed inter-pole magnetic circuits for each pair of magnetic poles. For example, as shown in FIG. 9, a four pole electrical machine structure is constituted by two pairs of field magnetic circuit structures 900, each of which is comprised of an independent inter-pole magnetic circuit and magnetic poles that are commonly coupled with the interactive electrical machine structure 901, the independent interpole magnetic circuits and poles together forming magnetic circuit structures 901 arranged to leave a ventilating opening 902 therebetween, the machine structure being comprised of the following elements:

A field magnetic circuit structure 900 constituted by two pairs of magnetic poles, each pair being connected by independent inter-pole magnetic circuit to provide four poles, the field magnetic circuit structure being integrally formed from sheets of good magnetic conducting material such as silicon steel sheets, or other material sheets or blocks. Each pair of magnetic poles is treated as an individual unit of the field magnetic circuit structure, is independently coupled with the interactive electrical machine structure in the radial direction, and is intercross distributed in N—S—N—S sequence. The field magnetic poles can be constituted by permanent magnets or single magnetic poles installed with excitation windings or multiple tooth-shaped magnetic poles with conductor slots for wrapping the excitation windings.

An interactive electrical machine structure 901 operatively associated with the magnetic poles and constituted by an alternator type armature, or an inducted type, winding type, permanent magnet type, good magnetic conductor type, or magnetic hysteresis type structural component, wherein the windings are distributed corresponding to the number of poles of the magnetic field, i.e., each magnetic pole can generate a motor or generator effect with the interactive electrical machine structure, one of the field magnetic structure or electrical machine structure being a fixed body, and the other being a moving body, or both of them being moving bodies, arranged for either rotational or linear driving.

As in the above-described embodiments, the arrangement of this embodiment is mainly characterized in that the clearance between a magnetic pole and its corresponding driven rotor is increased when the magnetic circuit is shorter (or the magnetic resistance is smaller) between the two magnetic poles of the same pair, or is decreased when the magnetic circuit is longer (or the magnetic resistance is larger) between the two magnetic poles of the same pair, to cause the clearance to vary asymmetrically between symmetrical positions at the two sides of the magnetic axis in order, thereby causing the magnetic force lines on the pole surface of the magnetic pole to be uniformly distributed and the magnetic force line distribution at the two sides of the magnetic pole to appear symmetrical, in order to better meeting the electrical machine requirements.

Figure 10:
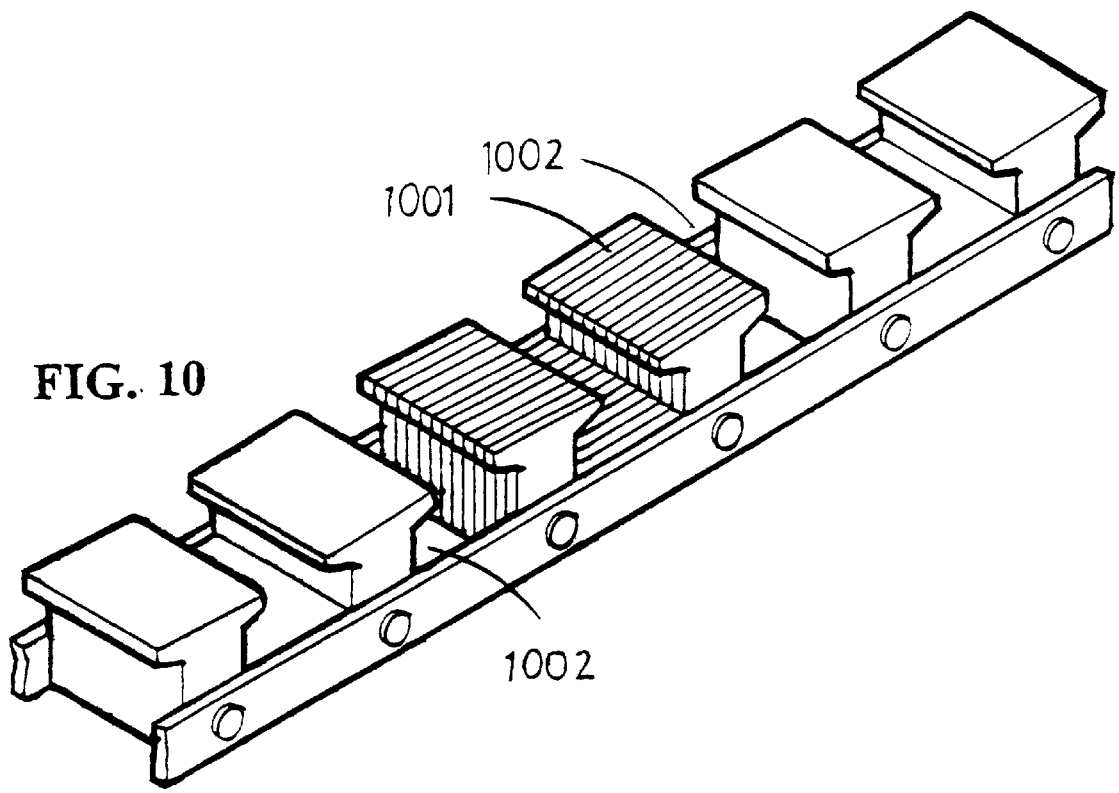
FIG. 10 is an isometric view of a variation of the electrical machine structure of FIG. 9 illustrating its application to linear driving structures.

The aforesaid embodiment is for four magnetic poles constituted by two pairs of magnetic poles, whereas for applications of more than two pairs of magnetic poles of the field magnetic circuit structure, the same concept can be expanded in both rotational and linear driving variations. FIG. 10 is a variation of the electrical machine structure of FIG. 9, illustrating its application in a linear driving environment, which can be treated as similar to the extension of a large diameter and multiple pole rotational electrical machine structure.

In a manner similar to that described above, for practical application of the intercross-coupled magnetic circuit structure with uniform magnetic resistance obtained by adjusting air clearance, the field magnetic poles may be constituted by permanent magnets, i.e., the permanent magnet type magnetic pole is coupled with the DC armature or coupled with an interactive electrical machine structure installed with at least two phases of winding to generate rotational magnetic field, or the field magnetic pole may include an electric power excited winding constituted by either a DC excited magnetic pole or AC excited winding, to produce an electromagnetic interacting effect that enables motor or generator functions to be obtained in cooperation with its coupled interactive electrical machine structure. Alternatively, the practical implementation may be constituted by a combined installation of field winding excitation type magnetic poles and permanent magnet type magnetic pole.

Figure 11:
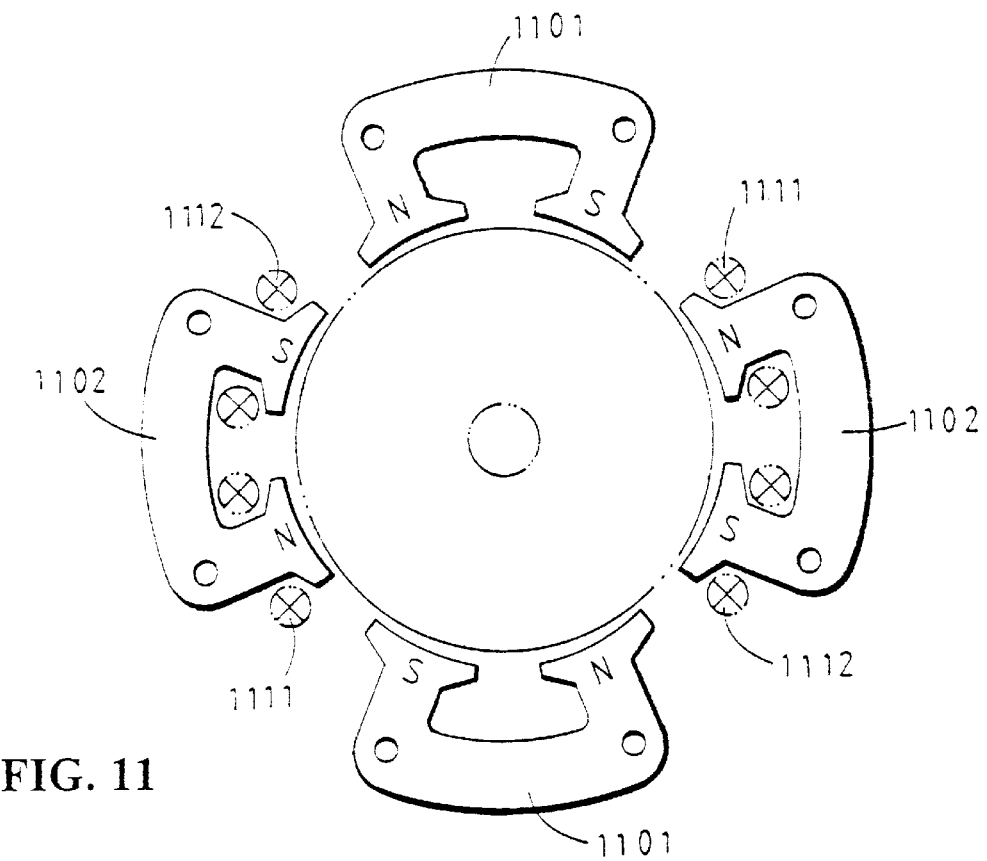
FIG. 11 is a plan view of a fourth preferred embodiment of the invention.

The combined installation of the interactive electrical machine structure shown in FIG. 11 is comprised of a combined installation of four or more than four magnetic poles. At least one pair of the magnetic poles is constituted by permanent magnet 1101, and the other poles are constituted by energizing the power excitation type magnetic pole 1102 through the excited windings 1111, 1112, or at least one pair of the magnetic poles is constituted by field winding excitation type magnetic poles 1102, while the other magnetic poles are constituted by permanent magnet type poles 1101.

Again, the electrical machine operating structures may include rotational or linear driving arrangements, and is characterized in that the clearance between the magnetic pole and its corresponding driven rotor is increased when the magnetic circuit is shorter (or the magnetic resistance is smaller) between the two magnetic poles of the same pair, or is decreased when the magnetic circuit is longer (or the magnetic resistance is larger) between the two magnetic poles of the same pair, so that the clearance varies asymmetrically at symmetrical positions at the two sides of the magnetic axis, and the magnetic force lines on the pole surface of the magnetic pole to be uniformly distributed to thereby better meet the electrical machine requirements.

Figure 12:
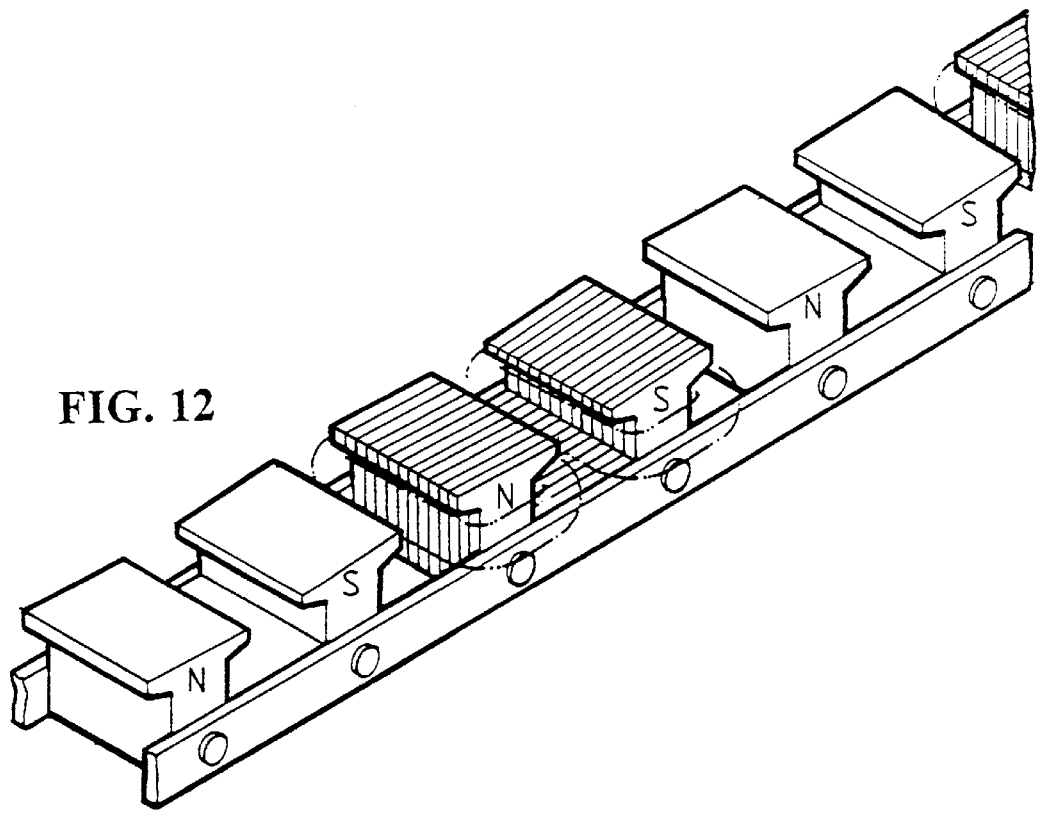
FIG. 12 is an isometric view of a variation of the electrical machine structure shown in FIG. 11, illustrating its application to linear driving structures.

FIG. 12 shows an example of a variation of the electrical machine structure of FIG. 11 for use in linear driving applications.

In yet another preferred embodiment of the invention, when the permanent magnet type magnetic poles are combined in an electrical machine structure used for motor or generator operations, because the permanent magnet type magnetic pole has a fixed polarity, the excited winding of the winding excitation type magnetic pole can be series combined with the armature and the serial combined polarity relation can be controlled to cause the electrical machine to exhibit either auxiliary excitation or differential excitation characteristics after the magnetic pole excited by the excited winding is combined with the whole electrical machine magnetic poles.

Again, the clearance between a respective magnetic pole and the corresponding driven rotor is increased when the magnetic circuit is shorter (or the magnetic resistance is smaller) between two magnetic poles of the same pair, or is decreased when the magnetic circuit is longer (or the magnetic resistance is larger) between the two poles of the same pair, so that the clearance varies asymmetrically between symmetrical positions at the two sides of the magnetic axis and the magnetic force lines on the pole surface of the magnetic pole are thereby uniformly distributed to cause the magnetic force line distribution at the two sides of the magnetic pole to appear symmetrical, and thereby better meet the electrical machine requirements.

The aforesaid intercross-coupled magnetic circuit structure with uniform magnetic resistance obtained by adjusting air clearance can also be constituted by magnetic conducting material arranged in multiple sections of independent magnetic circuit structures along the axial direction, i.e., the magnetic conducting material is divided into multiple section structures along the axial direction to provide geometrically-staged variations and is intercross-assembled to couple with the interactive electrical machine structures.

The at least one single-sided or double-sided inter-pole magnetic circuit of the aforesaid intercross-coupled magnetic circuit structure can also be obliquely extended to allow the surface of the interactive electrical machine structure to be intersected by inclined slots and face the heat-dissipating hole sequentially for easy heat dissipation, as shown in FIG. 13.

FIG. 14 is a front view of the double-sided obliquely-extended circuit of FIG. 13.

The operating structure of the preferred embodiment of FIG. 13 includes rotational or linear driving embodying types, with FIG. 15 showing a variation of the electrical machine structure of FIG. 13 illustrating its application to linear driving arrangements, which can be treated as similar to a rotational embodiment having a large diameter and multiple poles.

As will the other applicable electrical machine types of the intercross-coupled magnetic circuit structure with uniform magnetic resistance obtained by adjusting air clearance, the clearance between the aforesaid magnetic pole and its corresponding driven rotor is increased when the magnetic circuit is shorter (or the magnetic resistance is smaller) between the two magnetic poles of the same pair, or is decreased when the magnetic circuit is longer (or the magnetic resistance is larger) between the two magnetic poles of the same pair, so that the clearance varies asymmetrically between symmetrical positions at the two sides of the magnetic axis to cause the magnetic force lines on the pole surface of the magnetic pole to be uniformly distributed and appear symmetrical in order to better meet the electrical machine requirements. However, this embodiment permits various, flexible matching structures to be selected as needed, including all or part of the following:

An intercross-coupled magnetic circuit structure with uniform magnetic resistance as described above, but in which the sizes of the individual circuits of the multiple type inter-pole magnetic circuits can be the same or different, i.e., if the inter-pole magnetic circuit coupled between the magnetic poles uses a multiple circuit structure, then each of the circuits can be of the same size or a different size;

The aforesaid intercross-coupled magnetic circuit structure with uniform magnetic resistance can be a structure with two or more than two poles, i.e. under the same principle, a different number of magnetic poles can be selected;

The aforesaid intercross-coupled magnetic circuit structure with uniform magnetic resistance includes applications to AC or DC, brushed or brushless, synchronous or asynchronous rotational electrical machine structures;

The aforesaid intercross-coupled magnetic circuit structure with uniform magnetic resistance can have a coupled interactive electrical machine that includes rotors with AC or DC, brushed or brushless, synchronous or asynchronous rotational electrical machine structures, or with reverse interaction, i.e., the outside magnetic field can be a rotational body while the inside rotor is fixed, or both the outside and inside fields can be interactively rotated;

The aforesaid intercross-coupled magnetic circuit structure with uniform magnetic resistance can include the coupling of an attractable magnetic conductor to constitute an AC or DC electrical magnet;

The aforesaid intercross-coupled magnetic circuit structure with uniform magnetic resistance may be constituted by a non-closed type magnetically-conductive sheet material having two ends, and having magnetic poles integrally formed with the laminated inter-pole magnetic circuits, or separately installed magnetic poles which are then combined with the inter-pole magnetic circuits; and For the various aforesaid embodiments of intercross-coupled magnetic circuit structure with uniform magnetic resistance and varying air clearance, with the exception of the field magnetic circuit structure shown in FIG. 11, the coupled interactive electrical machine may include an attractable magnetic conductive interacting body, an alternator type armature, an inductive type interacting body, a permanent magnet type interacting body, or an eddy current or magnetic hysteresis type interacting electrical machine structure. The alternator type armature coupled by the field magnetic circuit structure of the embodiment of FIG. 11 is mainly composed of a wave winding, arranged in view of the particular average magnetic field intensity of the permanent magnet type poles and winding excitation type magnetic poles, although it can also be matched to couple with the various other interactive electrical machine structures described above.

Having thus described a preferred embodiment of the invention with sufficient particularity to enable those skilled in the art to easily make and use the invention, and having described several possible variations and modifications of the preferred embodiment, it should nevertheless be appreciated that still further variations and modifications of the invention are possible, and that all such variations and modifications should be considered to be within the scope of the invention. Accordingly, the scope of the invention should not be limited by the above description, but rather should be interpreted solely in accordance with the appended claims.

What is claimed is:

1. An arrangement of magnetic circuit structures, comprising:

a plurality of magnetic circuit units, each unit comprising at least two magnetic poles connected by a magnetic circuit structure with an end pole at each end of the magnetic circuit structure, wherein said magnetic poles are arranged to face an interactive electrical machine structure such that magnetic flux lines from said magnetic poles pass through said interactive electrical machine structure and cause relative motion between the magnetic circuit units and the interactive electrical machine structure, wherein said magnetic circuit units are stacked such that an accumulated thickness of the magnetic circuit units is approximately equal to a length in an axial direction of said interactive electrical machine structure, and wherein said stacked magnetic circuit units are intercrossed such each of said magnetic circuit structures in a first group of magnetic circuit units whose end poles are aligned in said axial direction is axially separated by a magnetic circuit structure having less than all of its end poles aligned with the end poles of the first group, thereby forming ventilation openings between said stacked magnetic circuit units.

2. An arrangement as claimed in claim 1, wherein a clearance between each of said magnetic poles and said interactive electrical machine structure varies asymmetrically so that said magnetic flux lines are uniformly distributed and appear to be symmetrical across a width of each of said poles.

3. An arrangement as claimed in claim 1, wherein said magnetic poles include electrical field windings.

4. An arrangement as claimed in claim 1, wherein said magnetic poles are permanent magnet poles.

5. An arrangement as claimed in claim 1, wherein said magnetic poles include field winding excitation poles and permanent magnetic poles.

6. An arrangement as claimed in claim 1, wherein said magnetic circuit structures comprise laminated sheets of magnetically conductive material.

7. An arrangement as claimed in claim 1, wherein said magnetic circuit units are combined to form a ring-shaped structure.

8. An arrangement as claimed in claim 1, wherein said magnetic circuit units are combined to form a linear structure.

9. An arrangement as claimed in claim 1, wherein a number of said at least two poles of each of said magnetic circuit units is greater than two, and said poles of each of said magnetic circuit units are arranged in N—S—N—S . . . sequence.

10. An arrangement of magnetic circuit structures, comprising:

a plurality of magnetic circuit units, each unit comprising at least two magnetic poles connected by a magnetic circuit structure with an end pole at each end of the magnetic circuit structure, wherein said magnetic poles are arranged to face an interactive electrical machine structure such that magnetic flux lines from said magnetic poles pass through said interactive electrical machine structure and cause relative motion between the magnetic circuit units and the interactive electrical machine structure, wherein said magnetic circuit units are stacked such that an accumulated thickness of the magnetic circuit units is approximately equal to a length in an axial direction of said interactive electrical machine structure, wherein at least two of said stacked magnetic circuit units are overlapped with less than all of their end poles axially aligned such that said ventilation openings are formed between said magnetic circuit units, and wherein a clearance between each of said magnetic poles and said interactive electrical machine structure varies asymmetrically so that said magnetic flux lines are uniformly distributed and appear to be symmetrical across a width of each of said poles.

11. An arrangement as claimed in claim 10, wherein said magnetic poles include electrical field windings.

12. An arrangement as claimed in claim 10, wherein said magnetic poles are permanent magnet poles.

13. An arrangement as claimed in claim 10, wherein said magnetic poles including field winding excitation poles are permanent magnet poles.

14. An arrangement as claimed in claim 10, wherein said magnetic circuit structures comprise laminated sheets of magnetically conductive material.

15. An arrangement as claimed in claim 10, wherein said magnetic circuit units are combined to form a ring-shaped structure.

16. An arrangement as claimed in claim 10, wherein said magnetic circuit units are combined to form a linear structure.

17. An arrangement as claimed in claim 10, wherein a number of said at least two poles of each of said magnetic circuit units is greater than two, and said poles of each of said magnetic circuit units are arranged in N—S—N—S . . . sequence.

* * * * *